United States Patent
Kampeas et al.

(10) Patent No.: US 10,050,892 B2
(45) Date of Patent: Aug. 14, 2018

(54) METHOD AND APPARATUS FOR PACKET CLASSIFICATION

(71) Applicant: MARVELL INTERNATIONAL LTD., Hamilton (BM)

(72) Inventors: Sefi Kampeas, Ramat Gan (IL); Gai Nachum, Rishon le Zion (IL)

(73) Assignee: MARVELL INTERNATIONAL LTD., Hamilton (BM)

( * ) Notice: Subject to any disclaimer, the term of this patent is extended or adjusted under 35 U.S.C. 154(b) by 220 days.

(21) Appl. No.: 14/596,786

(22) Filed: Jan. 14, 2015

(65) Prior Publication Data

US 2015/0200860 A1    Jul. 16, 2015

Related U.S. Application Data (60) Provisional application No. 61/927,266, filed on Jan. 14, 2014.

(51) Int. Cl.
| | | |
|---|---|---|
| *H04L 12/26* | (2006.01) | |
| *H04L 12/851* | (2013.01) | |
| *H04L 12/801* | (2013.01) | |

(52) U.S. Cl.
CPC ........ *H04L 47/2441* (2013.01); *H04L 43/026* (2013.01); *H04L 43/08* (2013.01); *H04L 47/11* (2013.01)

(58) Field of Classification Search
CPC ....... H04L 43/026; H04L 43/08; H04L 47/11; H04L 47/2441
USPC .......................................................... 370/329
See application file for complete search history.

(56) References Cited

U.S. PATENT DOCUMENTS

| | | | | |
|---|---|---|---|---|
| 7,032,072 B1* | 4/2006 | Quinn | ..................... | H04L 29/06 370/230.1 |
| 7,944,822 B1* | 5/2011 | Nucci | ................... | H04L 41/142 370/229 |
| 2003/0007489 A1* | 1/2003 | Krishnan | ................ | H04L 29/06 370/392 |
| 2007/0070907 A1* | 3/2007 | Kumar | .................... | H04L 47/10 370/235 |
| 2007/0166051 A1* | 7/2007 | Sebayashi | ........... | H04L 63/1416 398/177 |
| 2008/0013532 A1* | 1/2008 | Garner | .................... | H04L 45/00 370/389 |
| 2008/0077705 A1* | 3/2008 | Li | ............................ | H04L 47/10 709/236 |

(Continued)

*Primary Examiner* — Wutchung Chu
*Assistant Examiner* — Berhanu Belete (57) ABSTRACT

Aspects of the disclosure provide a method for packet classification. The method includes storing, in a computer memory of a network device, characteristic signatures of packet flows for network applications. The characteristic signature includes a pattern of two or more packet attributes of packets in packet flows for a network application. Then, the method includes receiving a stream of network packets at the network device, identifying one or more packet flows in the stream of network packets, processing the packets, at a packet processor, to obtain packet attributes of packets in the respective packet flows, and identifying a packet flow as being associated with a given network application when the packet attributes of packets in the packet flow match the characteristic signature of the given network application.

14 Claims, 4 Drawing Sheets

(56) References Cited

U.S. PATENT DOCUMENTS

| | | | | |
|---|---|---|---|---|
| 2008/0262990 A1* | 10/2008 | Kapoor | ............... | G06F 9/505 706/20 |
| 2008/0291923 A1* | 11/2008 | Back | ............... | H04L 45/04 370/396 |
| 2008/0307081 A1* | 12/2008 | Dobbins | ............... | H04L 63/20 709/223 |
| 2009/0034426 A1* | 2/2009 | Luft | ............... | H04L 41/5009 370/252 |
| 2009/0086651 A1* | 4/2009 | Luft | ............... | H04L 41/5067 370/253 |
| 2010/0251364 A1* | 9/2010 | Lee | ............... | H04L 63/145 726/22 |
| 2011/0032942 A1* | 2/2011 | Matthews | ............... | H04L 12/2876 370/392 |
| 2012/0033663 A1* | 2/2012 | Guichard | ............... | H04L 45/02 370/389 |
| 2012/0079101 A1* | 3/2012 | Muppala | ............... | H04L 47/2441 709/224 |
| 2012/0275466 A1* | 11/2012 | Bhadra | ............... | H04L 47/2441 370/419 |
| 2013/0223446 A1* | 8/2013 | Ernstrom | ............... | H04L 47/2441 370/392 |

\* cited by examiner

METHOD AND APPARATUS FOR PACKET CLASSIFICATION

INCORPORATION BY REFERENCE

This present disclosure claims the benefit of U.S. Provisional Application No. 61/927,266, "Packet Capture by Size in a Packet Processor" filed on Jan. 14, 2014, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In various scenarios, network devices act on packets based on layer 7 classifications. In an example, a network device receives a packet, and performs deep packet payload inspection to search for specific strings in the packet to determine the network application which the packet is associated with, and then acts on the packet according to a policy for the network application. The payload inspection typically requires elaborate and expensive classification engines and can be overly time consuming for some applications.

SUMMARY

Aspects of the disclosure provide a method for packet classification. The method includes storing, in a computer memory of a network device, characteristic signatures of packet flows for network applications. The packet flows includes two or more packets and a characteristic signature includes a pattern of two or more packet attributes in packet flows for a network application. Then, the method includes receiving a stream of network packets at the network device, identifying one or more packet flows in the stream of network packets, processing the packets, at a packet processor, to obtain packet attributes of packets in the respective packet flows, and identifying a packet flow as being associated with a given network application when the packet attributes of packets in the packet flow correspond to the characteristic signature of the given network application.

According to an aspect of the disclosure, the method includes extracting one or more packet attributes from headers of the packets in the packet flows. In an example, the method includes bit-masking a header of a packet to extract a payload size of the packet. In another example, the method includes bit-masking a header of a packet to extract a total length of the packet, and one or more header lengths, and calculating a payload size by subtracting the header lengths from the total length.

In an embodiment, the method includes storing in the computer memory of the network device at least one of patterns of time when packets of certain payload sizes are received and patterns of indexes in a packet flow that the packets at the indexes have certain payload sizes. In another embodiment, the method includes storing in the computer memory of the network device the characteristic signatures that specify patterns of two or more packet attributes of a byte rate of packets of certain payload sizes, an arrival rate of packets of certain sizes in time domain, an arrival rate of packets of certain sizes in location domain, an inter-arrival time between packets of certain sizes, an inter-arrival gap between packets of certain sizes, a payload size, a packet rate, a byte rate, an inter-arrival time, a number of packets.

According to an aspect of the disclosure, the method includes identifying the packet flow as being associated with the given network application according to a decision tree that makes a final decision through a sequence of branch decisions based on the packet attributes. In an example, the method includes building the decision tree that associates characteristic signatures with the network applications through sequences of branch decisions based on the packet attributes.

Aspects of the disclosure provide a network device including a memory, ports, and a packet processor. The memory is configured to store characteristic signatures of packet flows for network applications, the packet flows including two or more packets and a characteristic signature including a pattern of two or more packet attributes of the two or more packets in packet flows for a network application. The ports are configured to receive a stream of packets. The packet processor is configured to identify one or more packet flows in the stream of network packets, process the packets to obtain packet attributes of packets in the respective packet flows, and identify a packet flow as being associated with a given network application when the packet attributes of packets in the packet flow correspond to the characteristic signature of the given network application.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
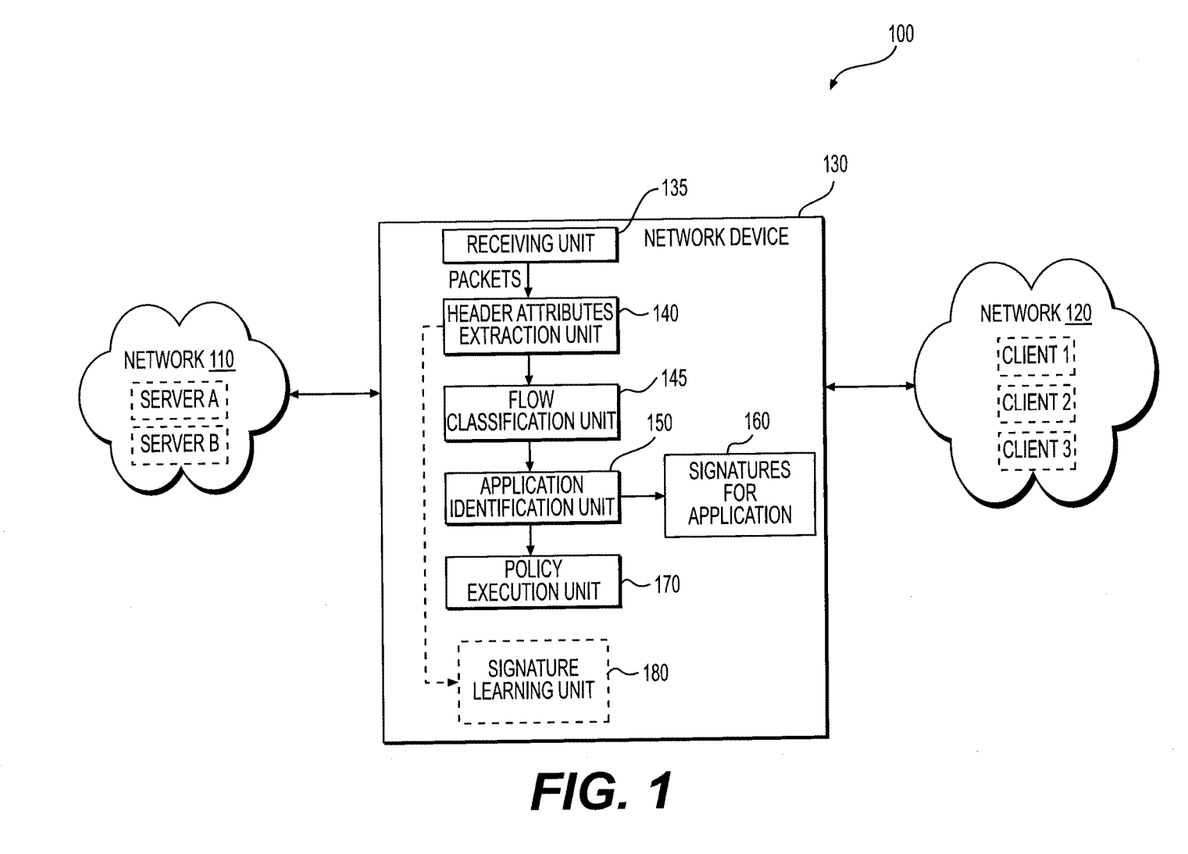
FIG. 1 shows a block diagram of a network system 100 according to an embodiment of the disclosure.

FIG. 1 shows a block diagram of a network system 100 according to an embodiment of the disclosure. The network system 100 includes a network device 130 that communicatively couples a first network 110 and a second network 120 together as shown in FIG. 1. The network device 130 includes a flow signature based application identification unit 150 configured to perform layer 7 classification of network traffic flows, such as flows of packets, according headers of the packets, based on identifying an attribute signature, without inspecting payloads of the packets.

Each of the first network 110 and the second network 120 can be a single network or a plurality of networks of the same or different types, such as a data network, a telecommunication network, a video distribution (e.g. cable, terrestrial broadcast, or satellite) network, a combination of telecommunications, video/audio distribution and data networks, a global network, a national network, a regional network, a wide-area network, a local area network, an in-home network, and the like. The network device 130 can be any suitable network device, such as a router, a switch, a modem, an Internet Protocol (IP) set-top box and the like.

For the purposes of discussion, in an example, the first network 110 is the Internet, and the second network 120 is a local area network (LAN) and the network device 130 is an edge device, such as an edge router, and the like configured to provide an entry point to the second network 120.

In an embodiment, the first network 110 includes a plurality of server hosts configured to provide resources and/or services and the second network 120 includes a plurality of client devices, such as desktop computers, laptop computers, and the like configured to request resources or services. In an example, each server host executes a server program to share the resources of the server host to client. Further, in the example, each client device executes one or more network application software to initiate communication sessions to request and receive the resources and services from the server hosts.

According to an aspect of the disclosure, the network device 130 is configured to perform actions on packets according to the network application that initiates the packets. In an embodiment, the network device 130 is configured to apply different policies to packets associated with the different network applications.

In an example, the network device 130 is configured to block traffic (e.g., packets) initiated from a specific network application. For example, the network device 130 is configured to block traffic (e.g., drop packets) of a social media application or of an application known to contain pornographic or malicious content. In another example, the network device 130 is configured to define quality of service on packets based on the network applications that initiate the packets. For example, the network device 130 is configured to define a relatively high quality of service on packets of Voice Over Internet Protocol (VOIP) phone application, and define a relatively low quality of service on packets of an on-line video game application.

Further, according to an aspect of the disclosure, the network device 130 is configured to use information in the headers of received packets for packet classification that associate packets to network applications that initiate the packets, without the need for deep packet inspection. In an embodiment, the network device 130 stores signatures of packet flows for one or more network applications, based on information that is obtained from the header or from packet behavior such as a time received. In an example, a signature for a network application specifies a specific pattern of one or more attributes for the network application. In an example, the attributes are extracted from packet headers or are from an extrinsic behavior of the packet without intensive computations by a central processing unit (CPU) (not shown) in the network device 130. For example, when the network device 130 receives a stream of packets, the network device 130 extracts one or more attributes from the headers of the packets, classifies the packets into packet flows, determines one or more extrinsic attributes such as the time of arrival of a packet, and forms a pattern for a newly received flow based on attributes selected from a set of packets in the given packet flow. When the pattern matches a stored specific pattern for a network application, the packet flow is associated with the network application. Then, the network device 130 performs one or more actions on the packets in the packet flow based on the associated network application.

In an embodiment, network traffic for a network application is sent according to a protocol and different network applications typically use different separately identifiable protocols. Thus, in an example, during session initiation packets corresponding to an application have attributes, such as payload size, packet rate, byte rate, inter-arrival time, number of packets, and the like that form a specific distinguishable pattern (e.g., a signature), based on the protocol used by the application. Such attributes are thus indicative of the network application, in an embodiment. In an example, packets, within a flow, having a certain payload size are sent at certain defined times or certain index in a flow and are thus indicative of the protocol used by the application. In another example, arrival rate, within a flow, of packets having a certain payload size (e.g., packet of size zero is sent every three seconds) is indicative of the protocol and the network application. In another example, arrival rate, within a flow, of packets with certain payload size in a sequence (e.g., packet of size zero is send every 3 packets) is indicative of the protocol and the network application. In another example, an interval time between packets, within a flow, having a certain payload size is indicative of the protocol and the network application used to send the packets. In another example, an inter-arrival gap between packets, within a flow, with certain payload size is indicative of the protocol and the network application.

Specifically, in the FIG. 1 example, the network device 130 includes a memory 160 for storing signatures of one or more network applications, a receiving unit 135 configured to receive packets, a header attributes extraction unit 140 for extracting attributes in headers of packets, a flow identification unit 145 for identifying flows to which the packets separately belong, an application identification unit 150 for layer 7 classification based on attribute patterns, and an application based policy execution unit 170 for conducting operations on packets according to the network application that initiates the packets. These elements are coupled together as shown in FIG. 1.

The memory 160 can be any suitable storage device, such as a static random access memory (SRAM), a dynamic random access memory (DRAM), a flash memory, a solid state drive, a hard drive, an optical drive, and the like. The signatures can be stored in any suitable data structures, such as tables, lists, and the like. In an example, a signature is stored in a form that facilitates a decision tree which makes a final decision through a sequence of branch decisions based on the packet attributes.

The receiving unit 135 is configured to receive packets and associate receiving information with the packets. In an example, the receiving unit 135 includes ingress ports to receive packets, and associates an ingress port number with a packet that enters the network device 130 via the ingress port. Further, in an example, the receiving unit 135 includes suitable timing circuits configured to capture arrival time of packets, and suitably associate the arrival time with the packets.

The header attributes extraction unit 140 is configured to extract attributes from the headers of packets. In an embodiment, the header attributes extraction unit 140 is configured to extract a payload size of each packet from a header of the packet. In an example, when a packet is formatted according to IPv4 protocol, the header of the packet includes a first field indicating a total length of the packet, a second field indicating an IP header length and a third field indicating a TCP header length. In an example, the header attributes extraction unit 140 uses bit masking to extract the total length of the packet, the IP header length and the TCP header length from the first field, the second field and the third field of the header. Then the header attributes extraction unit 140 subtracts the IP header length and the TCP header length from the total length to calculate the payload size of the packet. In another example, when a packet is formatted according to IPv6 protocol, the header has a dedicated field for payload length. Then, the header attributes extraction unit 140 uses bit masking to extract the payload length.

In an embodiment, the header attributes extraction unit 140 extracts other suitable information, such as sequence number, port number, and the like in the header. Further, the header attributes extraction unit 140 calculates suitable attribute values based on the extract information. Also, in an example, the respective arrival times of packets are recorded. The header attributes extraction unit 140 calculates, for example, a byte rate of packets of certain payload sizes, an arrival rate of packets with certain payload size in time domain, an arrival rate of packets with certain payload size in location domain, an inter-arrival time between packets of certain sizes, an inter-arrival gap between packets of certain sizes, a packet rate, a byte rate, an inter-arrival time, a number of packets and the like.

The flow classification unit 145 is configured to classify packets into flows based on header attributes and other suitable information, such as source address, destination address, source port, destination port, protocol type, and the like.

The application identification unit 150 is configured to perform packet classification based on the signatures for the network applications, in an embodiment. In an example, the application identification unit 150 builds a pattern of attributes from packets in a packet flow, and compares the pattern to the stored signatures. When the pattern matches a stored signature for a network application, the application identification unit 150 associates the packet flow to the matching network application. In another example, signatures are stored in the form of a decision tree to distinguish network applications. The application identification unit 150 uses the decision tree to perform packet classification.

The policy execution unit 170 then acts on the packets according to the classification based on a policy applicable to the identified application. In an example, the policy execution unit 170 drops packets of certain network applications. In another example, the policy execution unit 170 assigns quality of service to the packets of certain network applications. In another example, the policy execution unit 170 makes a copy of a packet initiated from certain network applications, and sends the copy to a monitoring device (not shown) in the second network 120 for example for further monitoring and classification.

According to an aspect of the disclosure, the network device 130 includes a signature learning unit 180 configured to learn the signatures of not previously learned network applications. In an example, when the network device 130 is not otherwise busy, the network device 130 receives packets flows that are initiated by a network application, and learns the signatures of network application via machine learning. For example, the header attributes extraction unit 140 extracts the packet attributes from the headers of the packets and provides to the signature learning unit 180. The signature learning unit 180 receives the packet attributes, inspects payloads of packets in the packet flows to identify the network applications associated with the packet flows, and builds the decision tree that distinguishes the network applications from other previously learned network applications based on the packet attributes.

It is noted that the header attributes extraction unit 140, the flow classification unit 145, the application identification unit 150, the policy execution unit 170 and the signature learning unit 180 can be respectively implemented in various techniques. In an embodiment, the header attributes extraction unit 140, the flow classification unit 145, the application identification unit 150, the policy execution unit 170 and the signature learning unit 180 are implemented using circuits in a packet processor. In another embodiment, the header attributes extraction unit 140, the flow classification unit 145, the application identification unit 150, the policy execution unit 170 and the signature learning unit 180 are implemented as software instructions executed by a processor, such as a central processing unit and the like.

Figure 2A:
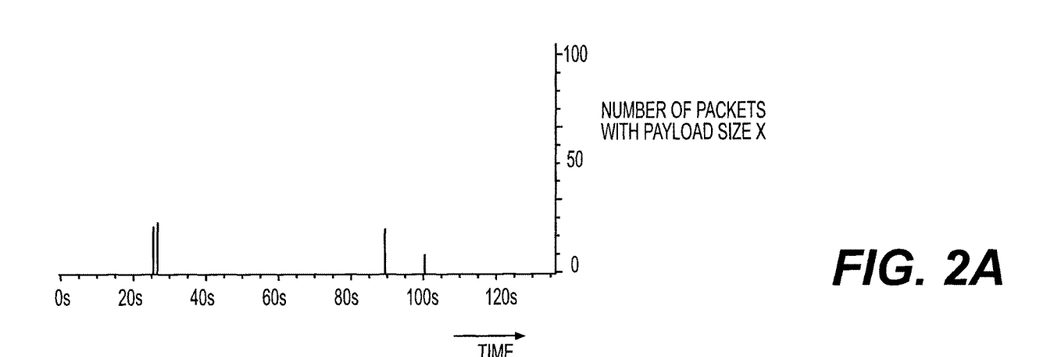
FIGS. 2A-2B show signatures associated with two network applications according to an embodiment of the disclosure.
Figure 2B:
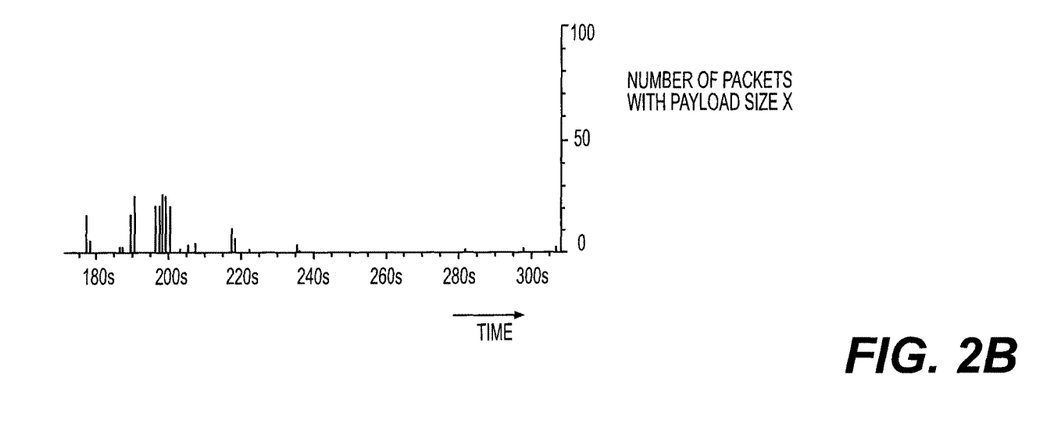

It is noted that, in an embodiment, the network device 130 uses other suitable technique to determine application specific information without performing deep packet payload inspection, and use the application specific information and the packet attributes pattern information to collectively identify the layer 7 application. In an example, the network device 130 is configured to count occurrences of certain byte values, such as disclosed in Applicant's co-pending application Ser. No. 14/275,332, filed May 12, 2014, and assigned to Marvell, which is incorporated herein by reference in its entirety FIGS. 2A-2B show examples of signatures associated with two different network applications. In each of FIGS. 2A and 2B, X-axis denotes time in second, and Y-axis denotes the number of packets with a payload size X (X is a natural number), and a height of a vertical line at a time indicates the number of packets with the payload size X received at the corresponding time.

In an embodiment, packets with payload in a range around X are considered the packets with the payload size X. In an example, X is zero, and when a packet with a payload size in the range from zero to 8 bytes, the packet is considered with a payload size of zero.

In the FIG. 2A example, the first network application has a relatively small number of packets with payload size X, and has a relatively small number of time durations, such as less than 5 time durations from time 0 s to time 120 s, when the packets with payload size X are received. In the FIG. 2B example, the second network application has a relatively large number of packets with payload size X, and has a relatively large number of time durations when the packets with payload size X are received from time 170 s to 220 s.

Figure 3:
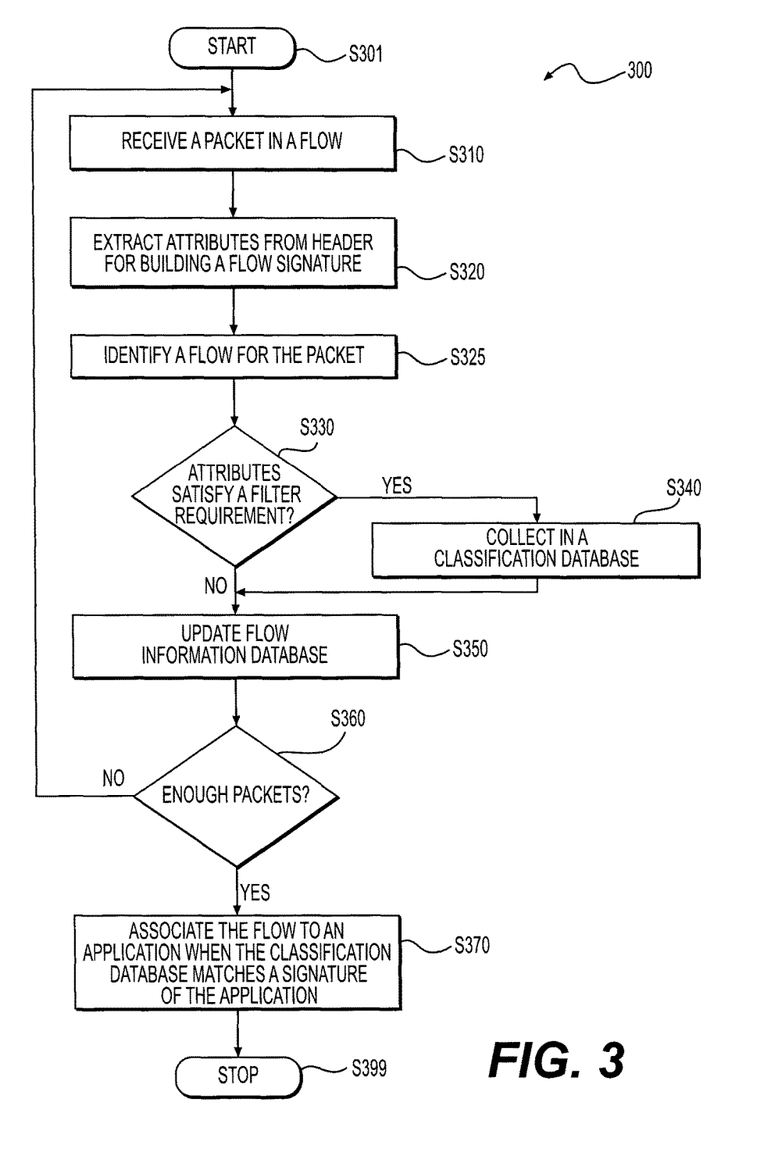
FIG. 3 shows a flow chart outlining a process 300 for traffic classification according to an embodiment of the disclosure.

FIG. 3 shows a flow chart outlining a process 300 for packet classification according to an embodiment of the disclosure. In an example, the process 300 is executed in a network device, such as the network device 130, to associate a flow of packets to a network application. In an embodiment, the process 300 is executed to build a header attribute pattern when a new flow of packets is received and identified. The process starts at S301 and proceeds to S310.

At S310, a packet is received. In the FIG. 1 example, the receiving unit 135 receives packets and associates receiving information with the packets. In an example, the receiving unit 135 associates an ingress port number with a packet that enters the network device 130 via the ingress port. Further, in an example, the receiving unit 135 associates an arrival time with the packet.

At S320, attributes are extracted from the header of the packet. In the FIG. 1 example, the header attributes extraction unit 140 extracts attributes from the header of the packet. In an example, the header attributes extraction unit 140 extracts a payload size from the header of the packet. In an example, when a packet is formatted according to IPv4 protocol, the header of the packet includes a first field for a total length of the packet, a second field for an IP header length and a third field for a TCP header length. In an example, the header attributes extraction unit 140 uses bit masking to extract the total length of the packet, the IP header length and the TCP header length from the first field, the second field and the third field of the header. Then the header attributes extraction unit 140 subtracts the IP header length and the TCP header length from the total length to calculate the payload size of the packet. In another example, when a packet is formatted according to IPv6 protocol, the header has a field for payload length. Then, the header attributes extraction unit 140 uses bit masking to extract the payload length.

Further, the header attributes extraction unit 140 calculates other suitable attributes for generating a signature, such as, for example, a byte rate of packets of certain payload sizes, an arrival rate of packets of certain sizes in time domain, an arrival rate of packets of certain sizes in location domain, an inter-arrival time between packets of certain sizes, an inter-arrival gap between packets of certain sizes, a payload size, a packet rate, a byte rate, an inter-arrival time, a number of packets, and the like.

In an embodiment, the header attributes extract unit 140 parses the header of the packet and extracts other suitable information, such as ingress port, egress port, source address, destination address, packet type (e.g., IP, TCP, UDP etc.), level of service, and the like from the header of the packet.

At S325, a packet flow for the packet is identified. In the FIG. 1 example, the flow classification unit 145 is able to uniquely determine a packet flow which the packet belongs to based on the header information of the packet, such as source address, destination address, source port, destination port, protocol type, and the like.

At S330, the network device determines whether the extracted attributes satisfy a filter requirement. In an example, the network device 130 determines whether the extracted payload length is in a range, such as is equal to or lower than 8 bytes in an example. When the payload length is in the specified range, the process proceeds to S340; otherwise, the process proceeds to S350.

At S340, information of the packet is collected in a classification database. In an example, the network device 130 stores a present value of a packet counter for the packet flow which is indicative of a location of the packet in the packet flow, a present time of a timer assigned to the packet flow, and a packet length of the present packet in a new record of the classification database.

At S350, information of the packet flow is updated. In an example, the network device 130 updates the packet counter for the packet flow (e.g., increasing by one for each received packet in the packet flow), the timer and the total number of bytes in the packet flow.

At S360, the network device determines whether enough packets in the packet flow have been received for the purpose of signature based classification of a flow as being associated with an application, and proceeds accordingly. For example, when the network device 130 has enough packets for classification, the process proceeds to S370; otherwise, the process returns to S310 to wait for more packets of the packet flow to be received.

At S370, the classification database is used in packet classification to associate the packet flow to a network application. In an example, the memory 160 stores signatures of network applications in the form of a decision tree. Then, using the decision tree, the application identification unit 150 associates the packet flow to a network application based on the classification database. In an embodiment, when the packet flow is associated with a network application, the policy execution unit 170 applies a policy for the network application on the packet, and also subsequent packets in the packet flow. The process proceeds to S399 and terminates.

It is noted that, in an embodiment, the protocol based application signatures can be predetermined, and provided to the network device 130 to be stored in the memory 160. In another embodiment, a protocol based application signature is learned by the network device 130 when a flow of packets initiated by a specific application is received for a first time.

Figure 4:
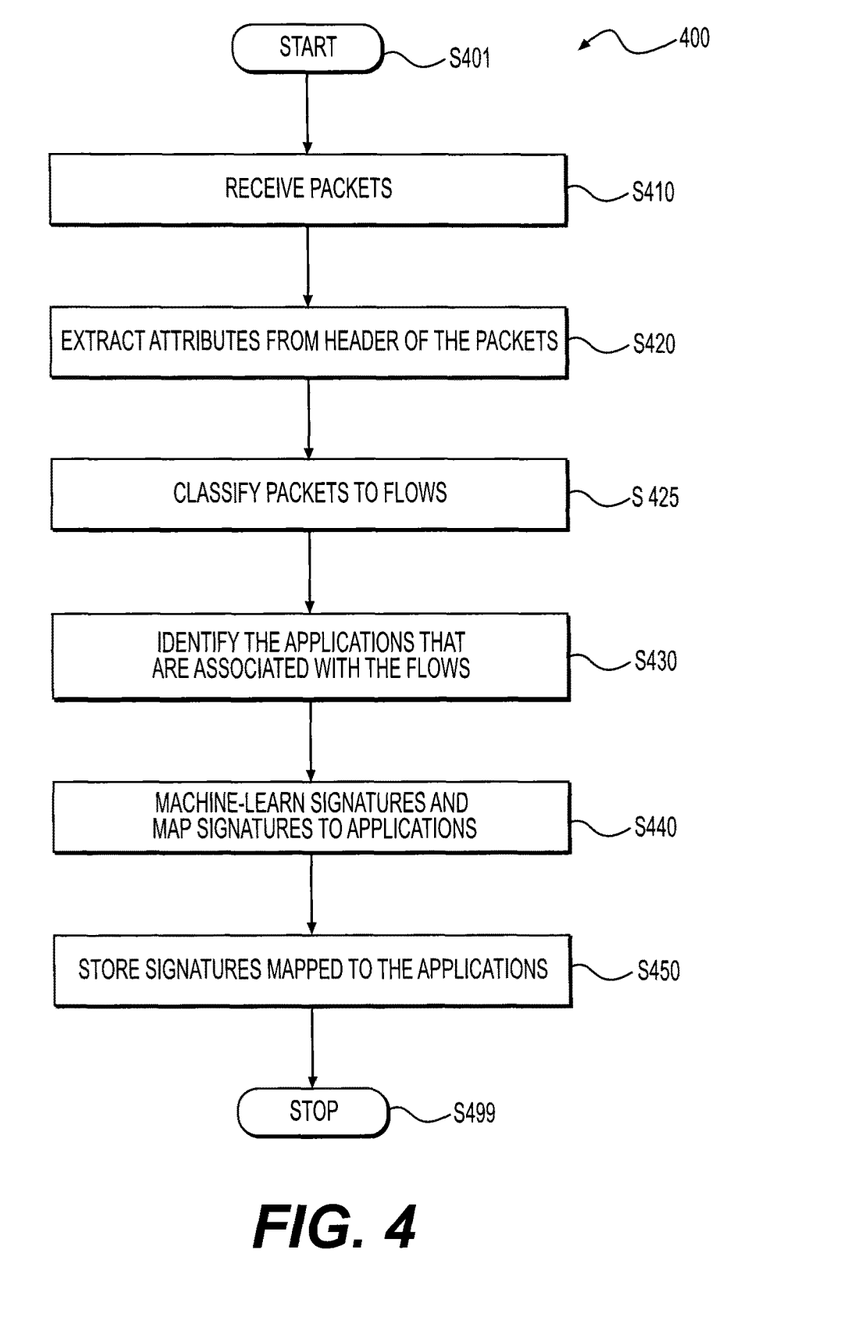
FIG. 4 shows a flow chart outlining a process 400 for signature learning according to an embodiment of the disclosure.

FIG. 4 shows a flow chart outlining a process 400 for learning signatures according to an embodiment of the disclosure. In an example, the process 400 is executed in the network device 130 when the network device 130 is not busy. The process starts at S401 and proceeds to S410.

At S410, packet flows are received. In an example, the network device 130 receives flows of packets that are initiated from network applications.

At S420, attributes from headers of the packets are extracted. In an example, the attributes are extracted by the header attributes extraction unit 140 at the time the packets are received, and the extracted attributes are stored in a classification database, such as described in the step S320.

At S425, the packet flows are identified. In an example, the flow classification unit 145 is able to uniquely determine the packet flows based on the header information of the packets, such as source address, destination address, source port, destination port, protocol type, and the like.

At S430, the network applications associated with the packet flows are identified. In an example, because the network device 130 is not busy, the network device 130 performs a deep payload inspection of one or more packets in a packet flow to identify the network application associated with the packet flow. The network device 130 can use any suitable technique, such as searching for specific strings, and the like, to identify the network application associated with the packet flow.

At S440, signatures based on two or more attributes are learned and mapped to the network application. In an embodiment, the two or more attributes are mutually independent. In an example embodiment, a number of packets of size X in a flow corresponding to an application is not dependent on a time at which such packets of size X are received at the switch device during initialization of the application. In an example, the network device 130 executes software instructions for machine-learning to build a decision tree based on the classification database and the identified network application. The decision tree is able to distinguish the network application from other network applications based on two or more types of unrelated attribute information related to the packets. The attribute information includes attribute information contained in the header as well as other attribute information such as ingress port and or a time at which the packet is received.

At S450, signatures of the attributes that are mapped to the network applications are stored. In an example, the network device 130 stores the signatures in the form to facilitate a decision tree which makes a final decision through a sequence of branch decisions based on the packet attributes. Then, when the network device 130 subsequently receives new packet flows initiated by the network application, the network device 130 identifies the network application based on packet attributes without payload inspection, some of the attributes being extracted from packet headers, such as described with reference to FIG. 3. Then, the process proceeds to S499 and terminates.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for packet classification, comprising:
   storing, in a computer memory of a network device, characteristic signatures of packet flows for network applications, the packet flows including two or more packets and the characteristic signature including a pattern of two or more packet attributes of the two or more packets in the packet flows for a network application, the packet attributes including patterns of time when packets of certain payload sizes are received;
   receiving a stream of network packets at the network device;
   identifying one or more packet flows in the stream of network packets, the one or more packet flows defined by packets having at least a characteristic packet type, a same source, and a same destination;
   processing the packets, at a packet processor, to obtain packet attributes of packets in the respective packet flows by extracting the one or more packet attributes from headers of the packets in the one or more packet flows, wherein extracting includes bit-masking the headers of the packets to extract a total length of the packets and one or more header lengths, and calculating a payload size by subtracting the header lengths from the total length; and
   identifying the one or more packet flows as being associated with a given network application when the packet attributes of packets in the packet flow correspond to the characteristic signature of the given network application.

2. The method of claim 1, wherein extracting the one or more packet attributes from the headers of the packets in the packet flows further comprises:
   bit-masking the header of the packet to extract a payload size of the packet.

3. The method of claim 1, wherein processing the packets, at the packet processor, to obtain the packet attributes of the packets in the respective packet flows further comprises:
   obtaining the packet attributes without inspecting payloads of the packets.

4. The method of claim 1, wherein storing, in the computer memory of the network device, the characteristic signatures of the packet flows for the network applications further comprises:
   storing in the computer memory of the network device the characteristic signatures that specify patterns of two or more packet attributes of a byte rate of packets of certain payload sizes, an arrival rate of packets of certain sizes in time domain, an arrival rate of packets of certain sizes in location domain, an inter-arrival time between packets of certain sizes, an inter-arrival gap between packets of certain sizes, a payload size, a packet rate, a byte rate, an inter-arrival time, a number of packets.

5. The method of claim 1, wherein identifying the packet flow as being associated with the given network application when the packet attributes of packets in the packet flow match the characteristic signature of the given network application further comprises:
   identifying the packet flow as being associated with the given network application according to a decision tree that makes a final decision through a sequence of branch decisions based on the packet attributes.

6. The method of claim 5, further comprising:
   building the decision tree that associates characteristic signatures with the network applications through sequences of branch decisions based on the packet attributes.

7. The method of claim 1, further comprising:
   taking actions on packets based on the identified network applications that are associated with the packets.

8. A network device, comprising:
   a memory configured to store characteristic signatures of packet flows for network applications, the packet flows including two or more packets and the characteristic signature including a pattern of two or more packet attributes of the two or more packets in the packet flows for a network application, the packet attributes including patterns of time when packets of certain payload sizes are received;
   ports configured to receive a stream of packets; and
   a packet processor configured to identify one or more packet flows in the stream of network packets, the one or more packet flows defined by packets having at least a characteristic packet type, a same source, and a same destination, process the packets to obtain packet attributes of packets in the respective packet flows, extract the one or more packet attributes from headers of the packets in the packet flows by bit-masking the header of the packet to extract a total length of the packet and one or more header lengths and calculate a payload size by subtracting the header lengths from the total length, and identify the one or more packet flows as being associated with a given network application when the packet attributes of packets in the packet flow correspond to the characteristic signature of the given network application.

9. The network device of claim 8, wherein the packet processor is configured to bit-mask the header of the packet to extract a payload size of the packet.

10. The network device of claim 8, wherein the packet processor is configured to obtain the packet attributes without inspecting payloads of the packets.

11. The network device of claim 8, wherein the memory is configured to store the characteristic signatures that specify patterns of two or more packet attributes of a byte rate of packets of certain payload sizes, an arrival rate of packets of certain sizes in time domain, an arrival rate of packets of certain sizes in location domain, an inter-arrival time between packets of certain sizes, an inter-arrival gap between packets of certain sizes, a payload size, a packet rate, a byte rate, an inter-arrival time, and a number of packets.

12. The network device of claim 8, wherein the packet processor is configured to identify the packet flow as being associated with the given network application according to a decision tree that makes a final decision through a sequence of branch decisions based on the packet attributes.

13. The network device of claim 12, wherein the packet processor is configured to build the decision tree that associates characteristic signatures with the network applications through sequences of branch decisions based on the packet attributes.

14. The network device of claim 8, wherein the packet processor is configured to act on packets based on the identified network applications that are associated with the packets.

\* \* \* \* \*